3,464,931
OXIDATION CATALYSTS
Giancarlo Aglietti, Pietro Baratella, Cesare Reni, and Luigi Lugo, Milan, Italy, assignors to Societá Italiana Resine S.p.A., Milan, Italy
No Drawing. Filed Jan. 18, 1967, Ser. No. 610,022
Claims priority, application Italy, July 12, 1966, Patent 773,211
Int. Cl. B01j *11/32;* C07c *45/16;* C01g *39/00*
U.S. Cl. 252—470                                   6 Claims

ABSTRACT OF THE DISCLOSURE

A process of preparing an unsupported catalyst for conversion of alcohols to aldehydes comprising mixing a precipitate of cobalt or nickel molybdate with 15 to 35 times by weight of a complex iron molybdate precipitates and subsequently performing at least one operation selected from the group consisting of drying, mechanical molding or calcining.

---

This invention relates to a catalyst useful in oxidizing alcohols to aldehydes, more particularly methanol to formaldehyde.

Molybdenum and iron oxide containing catalysts useful for the synthesis of formaldehyde by oxidation of methanol have long been known in the art and are normally prepared from diluted solutions of molybdenum and iron salts, in the form of complex salt precipitates which, after washing and filtering, are dried and pelletted.

These catalysts, however, strongly tend to crumble so that it was subsequently preferred to prepare an ineffective catalyst precursor, the mechanical properties of which would make its transport and charging to reactor possible without excessive crumbling. Alternatively catalysts supported on a nonmetal inert material have been employed.

Activation is then effected in the methanol oxidation reactor by a flow of hot air at 150–300° C. and is then practically pursued during use of the catalyst, since the temperatures at the reaction zone are of 400° C. at least with an unsupported catalyst.

With this procedure a gradual increase in time of the effectiveness of the catalyst is ascertained as the oxidation reaction of methanol to formaldehyde proceeds.

However, these though highly effective catalysts still exhibit a certain tendency to crumbling, so that powders are formed which involve pressure losses and a decrease of effectiveness thereby adversely affecting the reaction. Subsequently, an improvement of mechanical properties was introduced by adopting in the preparation of these catalysts a special mechanical processing in a plastic state before activation.

However, it is known that mechanical working such as extrusion, rolling and the like involve an increased compactness of the solid mass which results in a decreased specific area, consequently a decreased effectiveness of the catalyst.

Pending patent application No. 595,367 discloses an unsupported molybdenum and iron oxide containing catalyst of a high specific area (about 4 sq. m./g.) hence of high effectiveness, obtained by a special process which though dispensing from any mechanical working, yields a product of high mechanical properties.

The specific area of these unsupported catalysts containing molybdenum and iron oxides cannot, however, exceed given limits unless the characteristic properties of the catalyst are prejudiced, hence its useful life, presumably owing to an excessive porosity.

The main object of this invention is to provide a method of preparing a molybdenum and iron oxide containing catalyst modified by the addition, prior to any thermal treatment, of smaller quantities of a salt essentially corresponding to cobalt or nickel molybdate exhibiting, together with a high mechanical strength, a specific area, hence an effectiveness which are highly increased over any previously known catalyst containing molybdenum and iron oxide salts, utilized in the synthesis of formaldehyde to methanol.

It is known in the prior art such as in U.S. Patent 2,625,519 that catalysts substantially comprising cobalt and nickel molybdate catalyze, according to the special manner of use, various organic compound oxidation reactions, as well as desulphuretting, dehydrogenating, hydrogenating reactions, etc., inter alia dehydrogenation in a gaseous phase of methanol to formaldehyde.

These catalysts are obtained by precipitating under controlled conditions in solutions of cobalt (or nickel) and molybdenum salts with atomic ratios of 0.3:1 and 1:1, subsequently washing the precipitate, anhydrifying and heat-treating at 400–450° C. during several hours in the presence of air.

However, the effectiveness of these catalysts in dehydrogenation of alcohols to aldehydes is too high, so that it gives rise to a larger quantity of higher oxidation products, such as carbon oxides, with respect to molybdenum and iron oxide containing catalysts which are of a higher selectivity and with a consequential higher aldehyde yield from the starting alcohol.

It has now been surprisingly found that it is possible to substantially increase, by two or three times the specific area of the iron and molybdenum oxide containing catalysts by modifying them through the addition of small quantities of a salt essentially corresponding to cobalt or nickel molybdate, provided special precautions are taken in the preparation process. An object of this application for a method patent is therefore a method of preparing iron and molybdenum oxide containing catalysts modified by cobalt or nickel molybdates.

The said catalysts are of higher selectivity and effectiveness than catalysts containing iron or molybdenum oxides alone.

Moreover, it was found, in accordance with a further aspect of this application, that these catalysts can be easily pelletted to special hollow shapes such as to afford a high mechanical strength, which substantially avoids the formation of powders, and affords a long useful life through the low pressure loss in operation.

Summarizing, the objects of this invention are therefore as follows: preparing an unsupported, highly effective and selective catalyst for oxidation of alcohols to aldehydes, more particularly methanol formaldehyde, comprising molybdenum and iron oxides having thoroughly admixed therewith a few units percent of a salt essentially corresponding to cobalt or nickel molybdate, these catalysts being of a high specific area.

Preparing the said catalyst in hollow pills such as to afford a high mechanical strength deriving from their shape without substantially altering the high effectiveness and selectivity of the catalyst.

Preparing in a simple and convenient manner the catalyst so that storage over longer periods of time, transports and charging to the utilizing reactors are possible without affecting the properties thereof.

Further objects and peculiarities of the invention will be obvious from the appended description and experimental examples.

The catalyst according to this invention is prepared as follows:

The cobalt or nickel molybdate is obtained starting from molybdenum trioxide or from ammonium heptamolybdate direct by precipitation in an ammoniacal solution of either of these two compounds with cobalt or nickel chloride or nitrate, an atomic ratio of cobalt (or nickel)/molybdenum ranging between 0.5:1 being maintained.

The molybdic salt is preferably dissolved in an aqueous solution, the cobalt or nickel salt being dissolved in deionized water. The two solutions are heated to about 60–70° C. the solution of the cobalt or nickel salt being poured into the molybdic salt solution. The suspension is then heated up to 95–97° C., then decanted, the precipitate being washed with deionized water.

At this preliminary stage the ammoniacal solution preferably contains the molbydic salt or molybdenum trioxide in a concentration of 5 to 10% by weight, the quantity of ammonium being 10–12 times by moles the quantity of heptamolybdate of ammonium and 1.4–1.7 times by moles the molybdenum trioxide quantity.

The solution of the cobalt or nickel chlorides or nitrates shall be of a concentration preferbly ranging between 12 and 18% by weight.

The precipitate of the molybdenum and iron oxides is obtained by dissolving the ammonium heptamolybdate in deionized water so that the concentration in the solution ranges between 3 and 7% by weight. This solution, heated to 45–55° C. is gradually admixed during a period not less than 2 hours with a ferric chloride solution of a concentration ranging between 2 and 5% by weight.

Decanting and washing with deionized water is then carried out till the ammonium ion in the aqueous solution is below 0.2%.

The latter precipitation can also be effected by dissolving the ammonium heptamolybdate in a concentrated hydrochloric acid solution, diluting with deionized water the solution down to a concentration of the molybdic salt ranging between 3 and 7%, the molar ratio of the acid to the molybdic salt ranging between 12 and 18, preferably 15 and 16.

The acid solution of the molybdic salt is gradually admixed, in any case during a period of not less than two hours, with the described ferric salt solution. The whole is heated to about 50° C. and allowed to stand a few hours.

Finally, the pH of the solution is adjusted to about 1 by means of aqueous ammonia. Decanting and washing with deionized water are then effected till an ammonium ion content in the washing waters of less than 0.2% is reached.

At this stage the two suspensions are brought together while stirring so as to obtain by decantation a homogeneous precipitate which is recovered by filtering followed by squeezing which reduces the water content to a value ranging between 30 and 40%, preferably 35 and 38% by weight.

Alternatively, the two precipitates can be separately filtered, homogenisation being then carried out by treating the two panels in suitable mixers. The suspension of the cobalt or nickel molybdate is thus filtered to a water content preferably ranging between 50 and 55% by weight, the suspension of the second catalyst being brought, still by filtration, to a water content ranging between 65 and 75%.

Finally, the homogenized precipitates are squeezed to reduce their water content to within the above mentioned limits. The relative quantities of the reagents are selected, according to the particular process adopted, so that the mixture of the catalysts: A (molybdenum and iron oxides) and B (cobalt or nickel molybdate) is of a composition within the following limits:

Catalyst A: from 13.0 to 20.5 mole percent $Fe_2O_3$, from 79.5 to 87.0 mole percent $MoO_3$.

A/B ratio (by weight): 15 to 35.

The squeezed precipitate is then pelleted, dried at temperatures rising from room temperature up to 95–100° C. in the presence of an air flow to a water content ranging between 5 and 10% by weight. The granulate is formed to pills by means of a suitable machine preferably in hollow cylinder 4.5 mm. in height, the cross section whereof, of circular rim form, is 4.5 mm. in large diameter and 2 mm. in small diameter, though other shapes can of course be employed.

The conditions are adjusted so that the described hollow cylinders are of a mean weight equalling about 0.11–0.12 g.

The catalyst in pill form can be activated by charging it to the reactor and causing air to flow at a velocity of 1 liter/cc. catalyst/hour at temperatures of about 300° C. till the steam disappears from the gases. Effectiveness is then completed in subsequent use.

Alternatively, the catalyst in pill form is activated during 20–25 hours outside the utilizing reactor at temperatures gradually rising up to a maximum of 410–420° C. The catalyst is conveniently used in pills of the form as described not only for the reasons stated above, but additionally because it is less selective in a granulated form and gives then rise to an increased formation of carbon oxides in the oxidation of alcohols to aldehydes, though it is of higher effectiveness and spatial velocity and therefore yields an overall hourly production by unit of catalyst higher than catalysts containing molybdenum and iron oxides only. However, the limitation imposed at the spatial velocities by the high pressure loss in the utilizing reactors, due to the granulated form of the catalyst should be considered.

With the catalyst in pill form conversion by moles of methanol to formaldehyde amount to 90 to 95% at spatial velocities of 10 to 20 liters of reacting gases to cc. catalyst/hour.

The catalysts in pill form are of specific areas of the order to 10 sq. m./g. measured by the B.E.T. method.

The invention shall be further illustrated by a number of experimental examples which do not, however, impose any limitation on the scope of the invention.

EXAMPLE 1

64.6 g. ammonium heptamolybdate are dissolved in 810 cc. 1.1% solution by weight of ammonia.

At the same time 47.5 g. $CoCl_2$ are dissolved in 270 cc. water.

The two solutions are heated to about 70° C., the cobalt salt solution is poured into the ammoniacal solution of the molybdic salt and heated to 97° C., followed by decanting, washing with 300 cc. deionized water three times, decanting and discharging each time the aqueous layer. The precipitate is then filtered in vacuum.

1.02 kg. ammonium heptamolybdate are dissolved in 20 liter deionized water, heated to about 50° C. and admixed while stirring with a solution containing 336 g. $FeCl_3$ in 12 liter water. The precipitate is washed with deionized water till the ammonium ion in the aqueous layer is below 0.2% and finally filtered in vacuum. The two filtrates are brought together while stirring in a basin.

The first panel weighed about 89 g. and contained 53% dry substance whereby the solid residue is understood which is obtained by placing the panel into an oven at 105° C. and heating to constant weight.

The second panel weighed 2,830 g. and had a dry substance content of 28%.

The two filtrates are squeezed by means of a small laboratory hydraulic press to a water content of about 36% by weight.

The panel is granulated and sieved on a sieve of 0.85 mm. mesh, the powder being subsequently removed by sieving on a sieve of 0.297 mm. mesh. Drying is effected in a drying wind cupboard during 8 hours at room temperature, 5 hours at 40° C., 8 hours at 60° C. and 10 hours at 95–100° C.

At this stage the water content in the catalyst sinks to about 9% by weight, magnesium stearate (1% by weight) is then added and the mass is formed to pills in a Manesty Model BB3B pill moulding machine, whereby bodies of the above described form and an average weight of about 0.12 g. are obtained.

Finally, the pills are calcined by maintaining them during 2 hours at 200, 1 hour at 250, 14 hours at 300 and 6 hours at 420° C.

The catalyst A (molybdenum and iron oxides) in the catalytic mixture was of the following composition:

$Fe_2O_3$ = 15.5 mole percent
$MoO_3$ = 84.5 mole percent the weight ratio of the catalyst A to the catalyst B (cobalt molybdate) being 19.4.

The specific area of the catalyst measured by the B.E.T. method disclosed a value of 10.5 sq. m./g.

EXAMPLE 2

80 cc. of the catalyst the preparation of which was described in Example 1 are placed into a stainless steel tubular reactor, 15 mm. in bore, provided with an outer jacket for oil circulation in order to maintain the temperature in the reactor within the desired range.

The oxidizing gas of a composition by volume of about 10% oxygen and 90% nitrogen, obtained by feeding approximately equal volumes of nitrogen and air, is preheated to 180–190° C., the methanol supplied past the heated gas being vaporised by the said gas and the mixture being conveyed to the oxidation reactor.

In the latter the temperatures of the fluid circulating in the jacket are maintained at values such that an equilibrium the temperature of the reacted gases issuing from the reactor is about 310° C. The reaction gases are scrubbed with water in a column filled with Rashig rings. The analytic determinations are carried out in the aqueous solution.

750 N liter per hour of the above described oxidizing gas are supplied together with 7 g./hr. 100% methanol, the alcohol being measured by means of a suitable pump.

The reaction conditions are adjusted as described so that the reacted gases are at a temperature of about 310° C. on issue from the reactor, the reaction being continued during 200 hours.

During the next 100 hours the reaction yields are checked. As an average 64.0 g./hr. formaldehyde are obtained with a yield by moles of 94.8% methanol to formaldehyde and an output equalling 800 g. 100% formaldehyde liter catalyst/hr.

Determination of the side products or unaltered product in the aqueous formaldehyde knock down solution exhibited the presence to 100 parts 100% formaldehyde of less than 0.015 part formic acid and about 1.6 parts methanol.

EXAMPLE 3

By using the catalyst described in Example 1 and conditions and equipment described in Example 2, 900 N liter/hr. oxidizing gaseous mixture are supplied to the oxidator together with 90 g./hr. 100% methanol.

As an average 78 g./hr. 100% formaldehyde are obtained with a yield by moles of 92.5% methanol to formaldehyde and an output equalling 1.155 g. 100% formaldehyde/liter catalyst/hr.

EXAMPLE 4

By using the catalyst described in Example 1 and conditions and equipment disclosed by Example 2, 1,200 N liter/hr. oxidizing mixture are supplied to the oxidator together with 110 g./hr. 100% methanol.

As an average 94 g./hr. 100% formaldehyde are obtained with a yield by moles of 91.1% methanol to formaldehyde and a production equalling 1.175 g. 100% formaldehyde/liter catalyst/hr.

EXAMPLE 5

By using the catalyst described in Example 1 and conditions and equipment described in Example 2, 1,400 N liter/hr. oxidizing mixture are fed to the oxidator together with 130 g./hr. 100% methanol.

As an average 110 g./hr. 100% formaldehyde are obtained with a yield by moles of 90% methanol to formaldehyde and an output equalling 1,375 g. 100% formaldehyde/liter catalyst/hr.

EXAMPLE 6

A catalyst is prepared exactly as described in Example 1 with the difference only that the material in pill form is activated in the utilising reactor by causing air (1 liter/cc. catalyst/hr.) heated to 300° C. to flow till steam disappears in the gas issuing from reactor.

By using the conditions and equipment described in Example 1, 2,900 N liter/hr. oxidising mixture are fed together with 86 g./hr. 100% methanol.

The temperature of the reacted gases issuing from the reactor is adjusted to about 310° C., the reaction being pursued during 200 hrs. During the next 100 hrs. the analytic determinations are carried out. As an average 75 g./hr. 100% formaldehyde are obtained with a yield by moles of 93% methanol to formaldehyde and an output equalling 937 g. 100% formaldehyde/liter catalyst/hr.

EXAMPLE 7

A solution is formed from 20.9 g. ammonium heptamolybdate and 31 cc. 10% (weight volume) ammonia in 230 cc. water and is heated to about 70° C.

A solution formed from 29.1 g. cobalt chloride hexahydrate in 100 cc. of water is heated to about 70° C. and poured into the molybdic salt solution.

The temperature is raised to 97° C., the solution is then allowed to cool and decanted, and the precipitate is washed three times with 100 cc. deionized water.

300 g. ammonium heptamolybdate are dissolved in 6 liter deionized water in another container and the temperature is raised to about 500° C. The molybdic salt solution is admixed while stirring with 165 g. ferric chloride hexahydrate dissolved in 3.3 liter water, decanted, washed with deionized water till the ammonium ion in an aqueous state is below 0.2%

The two suspensions are mixed together (the former containing about 10 g., the latter about 237 g. solid substances) by pouring the former into the latter, stirred for homogenizing and filtered in vacuum to a water content of about 67%. The precipitate is squeezed to a water content of about 37%, then granulated and sieved on a 0.85 mm. mesh sieve, subsequently on a 0.297 mm. sieve in order to remove the pulverized fraction. The further operations are similar to those described in Example 1.

The final product is of a specific area of about 10 m.²/g. as measured by the B.E.T. method.

In the final catalytic mixture the catalyst A (molybdenum and iron oxides) was of the following composition:

$Fe_2O_3$ = 17.5 mole percent
$MoO_3$ = 82.5 mole percent the weight ratio of the catalyst A to the catalyst B (cobalt molybdate) equalling 24.7.

EXAMPLE 8

80 cc. catalyst described in Example 7 are charged to the reactor described in Example 2. Under the conditions described in Example 2, 1,100 H liter/hr. oxidizing gaseous mixture are fed together with 102 g./hr. 100% formaldehyde. As an average 87.5 g./hr. 100% formaldehyde are obtained, the yield by moles of methanol to formaldehyde being 91.5%, the output equalling 1090 g. formaldehyde/liter catalyst/hr.

EXAMPLE 9

52.7 g. molybdenum trioxide are dissolved in 810 cc. 1.1% b.w. ammonia solution. At the same time 47.5 g. $CoCl_2$ are dissolved in 270 cc. water. The two solutions are heated to about 70° C., the cobalt salt solution being then poured into the ammoniacal molybdenum trioxide solution, followed by heating to 97° C., decanting and washing with 300 cc. deionized water three times, the aqueous layer being decanted and discharged every time. The precipitate is finally filtered in vacuum.

1.04 ammonium heptamolybdate are dissolved in another container in 1.3 liters 31% HCl and diluted with 17 liters deionized water.

This solution is admixed with a solution containing 755 g. ferric chloride hexahydrate in 16 liter water, heated to 50° C. and allowed to stand 2 hours. The solution is then admixed while stirring with aqueous ammonia to a 1.1 pH, thereafter repeatedly washing with water till the ammonium ion in the aqueous ion is below 0.2%, then filtering in vacuum.

The two filtrates are mixed together, the former being 83 g. in weight with about 45% dry substance, the latter 2,620 g. in weight with 31% dry substance.

By proceeding as described in Example 1 a final catalyst is obtained of a specific area of 10.5 sq. m./g.

In the final catalytic mixture the catalyst A (molybdenum and iron oxides) was of the following composition:

$Fe_2O_3$ = 13.8 mole percent
$MoO_3$ = 86.2 mole percent the weight ratio of catalyst A to catalyst B (cobalt molybdate amounting to 21.7).

EXAMPLE 10

80 cc. of the catalyst described in Example 9 are charged to the reactor described in Example 2. Under the conditions of Example 2 900 liter/hr. oxidizing gaseous mixture are fed together with 85 g./hr. 100% methanol. As an average 74 g./hr. 100% formaldehyde are obtained with a molar yield of methanol to formaldehyde of 92.8% and an output equalling 925 g. 100% formaldehyde/liter catalyst/hr.

Analytical determinations on the aqueous formaldehyde knock down solution showed 1.7 g. methanol and less than 0.015 g. formic acid to be present to 100 g. formaldehyde.

EXAMPLE 11

The catalyst prepared on a semiindustrial scale along the conditions of Example 7 and substantially of the same characteristic properties was utilized in tube bundle pilot plant equipped with a part recycling of the exhausted reaction gases, preheaters for the reagent gases, cooling system for the reacted gases, carburetor in which the methanol supplied by a measuring pump is vaporised and a water knock down column for the reaction products. The stainless steel tube bundle reactor comprises 285 tubes 12 mm. in bore, 1050 mm. in length each containing 85 cc. catalyst in pill form. The tubes plunge in oil which is circulated by a pump.

The oxidizing gaseous mixture comprising about 20% by volume air, the balance being recycled gases and the (100%) methanol are fed at a rate of 230 N cm./hr. and 21.5 kg./hr., respectively, to the reactor after having been preheated to 250–255° C. approximately.

The temperature of the circulating oil is maintained at values such that the reacted gases are at temperatures ranging between 290 and 300° C. above the heat exchanger which lowers the temperature of the reaction gases before knocking them down with water. During 12 months uninterrupted run the pressure loss in the tubes rose from about 60 to 120 mm. Hg.

During this period the average hourly output was 19.0 kg./hr. 100% formaldehyde. The molar conversion percentage of methanol to formaldehyde is about 94.3.

The analytical determinations showed the formic acid content to be lower than 0.02 part to 100 parts 100% formaldehyde.

What we claim is:
1. A process for the preparation of an unsupported shaped catalyst capable of converting methanol to formaldehyde, which catalyst consists essentially of:
    (a) molybdenum oxide and iron oxide wherein the $Fe_2O_3$ content is from 13.0 to 20.5 mole percent and the $MoO_3$ content is from 79.5 to 87.0 mole percent; and
    (b) cobalt molybdate wherein the ratio by weight of (a) to (b) is from 15 to 1 to 35 to 1 and wherein said catalyst is characterized by a high specific surface and high mechanical properties, which process comprises:
        (1) gradually adding an aqueous solution continuing from 2 to 5% by weight of ferric chloride to an aqueous solution containing 3 to 7% by weight ammonium heptamolybdate and sufficient hydrochloric acid so that the molar ratio of acid to ammonium heptamolybdate is from 12 to 1 to 18 to 1 so as to obtain a suspension of a solid precipitate in said aqueous solution; heating the resulting aqueous suspension to a temperature of from about 45 to 55° C.; adjusting the pH of said aqueous suspension to about 1, washing said precipitate so as to reduce the ammonium ion content in the wash water to below about 0.2% by weight;
        (2) preparing a second aqueous suspension by admixing an aqueous solution containing 12 to 18% by weight cobalt chloride or cobalt nitrate which has been heated to a temperature of between 60 to 70° C. with an aqueous solution prepared by heating an aqueous solution containing from 5 to about 10% by weight of ammonium heptamolybdate or molybdenum trioxide and ammonia wherein the amount of ammonia present is sufficient to provide a molar ratio of ammonia to molybdenum of from 10 to 1 to 12 to 1;
        (3) homogenizing the precipitate obtained in each of steps (1) and (2);
        (4) reducing the water content of said homogenized precipitate to an amount ranging from 30 to 40% by weight so as to obtain a conglomerate;
        (5) crushing said conglomerate so as to form particles ranging from about 0.3 to about 0.85 mm.;
        (6) drying said particles at a temperature of up to 100° C. so as to reduce still further the water content to an amount ranging from 5 to 10% by weight;
        (7) pelletizing said dried particles into hollow cylinders;
        (8) and calcining said hollow cylinders.
2. The process of claim 1 wherein said dried particles are pelletized to a diameter of between 2 mm. and 4.5 mm. in diameter.

3. The process of claim 1 wherein said dried particles are pelletized to a weight of between 0.11 to 0.12 gram.

4. The process of claim 1 wherein the water content of said homogenized precipitate is reduced to an amount of between 35–38% by weight.

5. The process of claim 1 wherein said hollow cylinders are calcined in step (8) by heating said cylinders for 20–25 hours at a gradually rising temperature of from 410° C. to 420° C.

6. The process of claim 1 wherein said hollow cylinders are calcined in step (8) by heating said cylinders in a hot air flow at a temperature of about 300° C.

References Cited

UNITED STATES PATENTS

| | | | |
|---|---|---|---|
| 2,625,519 | 1/1953 | Hartig | 252—470 XR |
| 2,849,492 | 8/1958 | Allyn et al. | 252—470 XR |
| 3,198,753 | 8/1965 | Traina | 252—470 |

PATRICK P. GARVIN, Primary Examiner

U.S. Cl. X.R.

260—603